US006981310B2

(12) United States Patent
Sandoval

(10) Patent No.: US 6,981,310 B2
(45) Date of Patent: Jan. 3, 2006

(54) HANDGRIP INSTALLATION TOOL

(76) Inventor: Anthony M. Sandoval, 31417 Park Blvd., Nuevo, CA (US) 92567

( * ) Notice: Subject to any disclaimer, the term of this patent is extended or adjusted under 35 U.S.C. 154(b) by 160 days.

(21) Appl. No.: 10/279,706

(22) Filed: Oct. 23, 2002

(65) Prior Publication Data

US 2004/0078947 A1 Apr. 29, 2004

(51) Int. Cl.
*B23P 19/02* (2006.01)
*B23P 19/00* (2006.01)

(52) U.S. Cl. .......................... 29/700; 29/235; 29/426.6

(58) Field of Classification Search .................. 29/235, 29/255, 263, 280, 426.6, 448, 449, 450, 700; 222/324, 334, 389

See application file for complete search history.

(56) References Cited

U.S. PATENT DOCUMENTS

| | | | | |
|---|---|---|---|---|
| 2,320,964 | A * | 6/1943 | Yates | 239/291 |
| 2,604,361 | A * | 7/1952 | Yates | 239/291 |
| 3,900,941 | A * | 8/1975 | Browning et al. | 29/450 |
| 4,060,874 | A * | 12/1977 | Furutsutsumi | 15/405 |
| 4,677,872 | A * | 7/1987 | Nishida et al. | 74/551.9 |
| 6,460,237 | B1 * | 10/2002 | Tsiguloff | 29/235 |
| 2002/0010992 | A1 * | 1/2002 | Carey et al. | 29/235 |

* cited by examiner

*Primary Examiner*—Marc Jimenez
(74) *Attorney, Agent, or Firm*—Michael G. Petit

(57) ABSTRACT

A pneumatic tool for facilitating the installation and removal of a hollow, elastically extensible handgrip on a tubular portion of a device such as, for example, the handlebar of a bicycle or motorcycle. The tool has a handle portion adapted to be comfortable gripped by the hand. A proximal end of the handle portion is adapted to provide a leak-proof connection to a source of compressed air. The distal (opposing) end of the handle portion has an extension portion extending distally therefrom with a relatively short insertion tip portion having an air injection port extending laterally from a distal end of the extension portion. The insertion tip portion is angled with respect to the axis of the handle portion of the tool and has a convex upper surface and a concave lower surface; the curvature of the lower surface substantially conforming to the curvature of the outer surface of the tubular member.

2 Claims, 4 Drawing Sheets

HANDGRIP INSTALLATION TOOL

BACKGROUND OF THE INVENTION

1. Field of the Invention

The present invention is a tool for installing and removing a hollow, elastically extensible handgrip on a tubular member.

2. Prior Art

Numerous types of handgrips are known in the art for providing a comfortable, stable gripping surface for operating a device such as a tool or a bicycle/motorcycle. Handlebar grips have been designed to make bicycle riding more comfortable and to minimize the slippage of the hand on the handlebar. Handlebar grips are provided to increase the gripping surface and slip resistance. Various types of both smooth grips and textured grips have been designed. All such handgrips are hollow, having an axial cylindrical cavity therewithin and may have indentations and projections on the outer surface thereof to provide a desirable gripping surface. Examples of such designs are illustrated in U.S. Pat. Nos. D. 144,446; D. 231,044 and D. 248,616. Such handgrips are normally affixed to the outer surface of a tubular member comprising a handle portion of the device such as, for example, a bicycle handlebar, by sliding the handgrip over an end of the tubular member until correctly positioned. Accordingly, most such handgrips are elastically extensible, or have an elastically extensible or compressible inner surface on the wall of the cylindrical cavity therewithin, to permit a snug fit against the cylindrical, usually inelastic outer surface of the tubular member. Friction between the tubular member and the inner surface of the handgrip desirably provides a resistant force that resists or prevents the unintentional removal of the handgrip from the tubular member. Frictional forces also make it difficult to advance the handgrip over the tubular member during the installation thereof.

Lubricants can be used to facilitate the installation of such handgrips but do not enable secure attachment of the handgrip to the tubular member after installation. Lubricants are of limited value in removing a handgrip from a tubular member. Further, bicycles and motorcycle handlebars have control mechanisms such as brakes or clutches mounted thereon adjacent to the handgrip which impede access to the handgrip for removal from the handlebar. There is a current need for a tool and a method for using the tool to facilitate the installation and removal of a handgrip from a tubular member.

SUMMARY

It is an object of the present invention to provide a tool that delivers compressed air into the interface between an elastically extensible inner wall of a hollow handgrip and the cylindrical outer surface of a tubular member enveloped by the handgrip in order to facilitate movement of the handgrip over the tubular member during installation or removal of the handgrip.

The above objectives of the invention are met by the provision of a device operable for injecting a fluid medium from a source of fluid medium such as compressed air, the source having a fluid output port, into an interface between a handgrip and a tubular member, wherein the handgrip comprises an elongate, substantially cylindrical member comprised of an elastomeric material and having a cylindrical recess in an open end thereof, said cylindrical recess defining a cavity. The device comprises a handle portion and an insertion tip attached to, or integral with, the handle portion. The handle portion is adapted to be grasped by a hand, and has a proximal end adapted to sealingly engage the fluid outlet port of the source of fluid medium, a distal end and a first fluid-conducting conduit between the proximal and distal ends thereof. The insertion tip has a proximal end affixed to and sealingly engaging the distal end of the handle portion, a distal end having an opening therein and a second fluid-conducting conduit in fluid communication with the first fluid-conducting conduit and the opening in the distal end of the insertion tip. The distal end of the insertion tip preferably has an arcuate transverse cross-section. The handle portion and the insertion tip are integral with one another and may be either unitary in construction or modular. The handle portion preferably further comprises a manually operable valve operable for contolling fluid flow through either the first or second fluid-conducting conduits. The preferred fluid medium is compressed air.

The features of the invention believed to be novel are set forth with particularity in the appended claims. However the invention itself, both as to organization and method of operation, together with further objects and advantages thereof may be best understood by reference to the following description taken in conjunction with the accompanying drawings.

DESCRIPTION OF THE PREFERRED EMBODIMENTS

Figure 1:
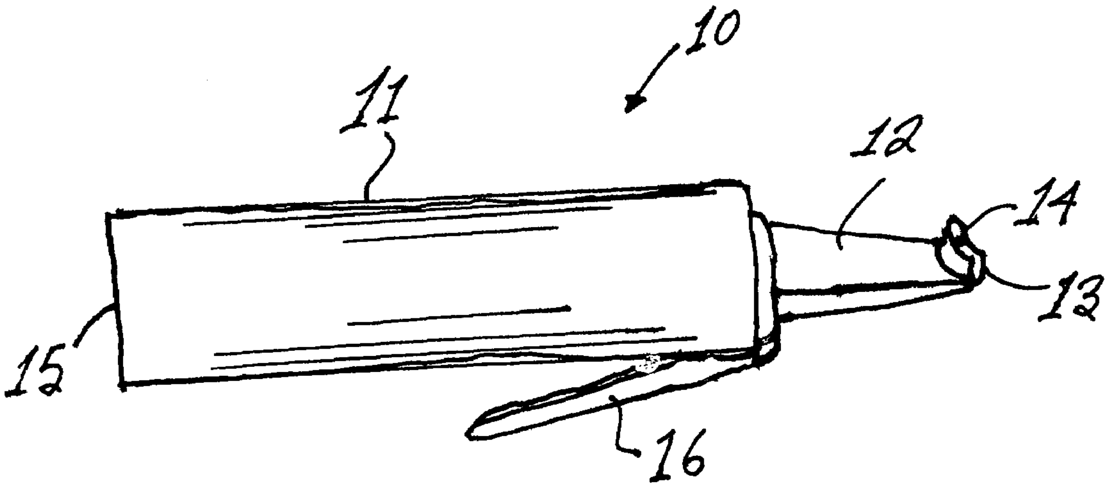
FIG. 1 is a perspective view of a pneumatic handgrip tool in accordance with a first preferred embodiment of the present invention.
Figure 2:
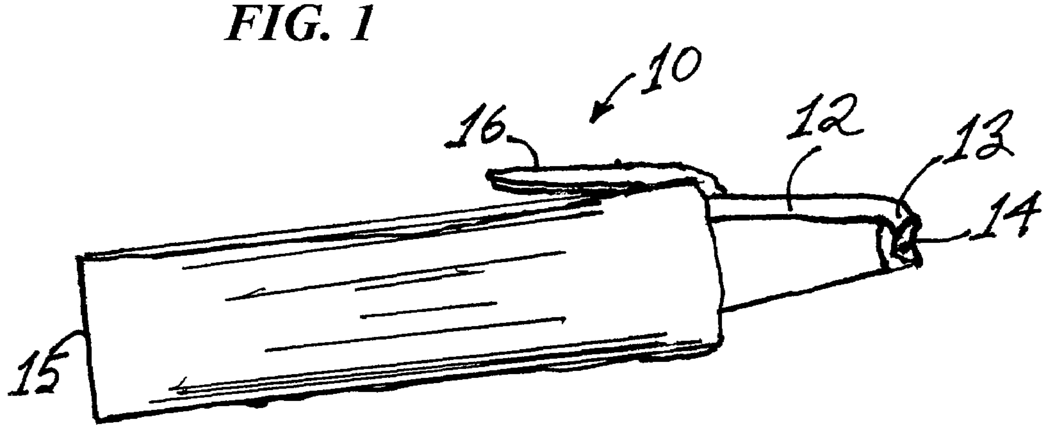
FIG. 2 is a perspective view of the tool illustrated in FIG. 1 rotated 90°.
Figure 3:
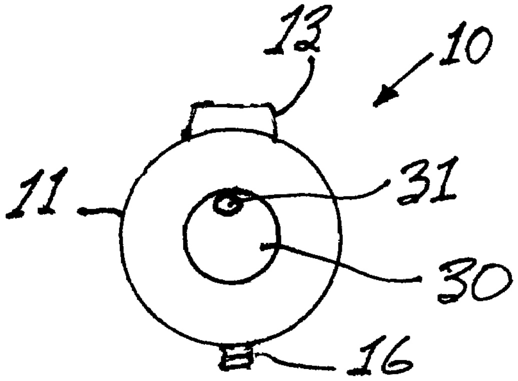
FIG. 3 is an end view of a tool in accordance with FIGS. 1 and 2 viewed from left to right.

Turning now to FIGS. 1 and 2, a handgrip tool in accordance with a first preferred embodiment of the present invention is indicated at numeral 10. FIG. 2 shows the tool 10 rotated 90° from the view shown in FIG. 1. The tool 10 has a handle portion 11, an extension portion 12 and an insertion tip portion 13 having an air injection port 14 in a distal end thereof. The proximal end 15 of the handle portion 11 has compressed air line attachment means 30 (FIG. 3) such as a ⅜" male threaded hole or a "quick coupler" type of connector therein. The handle portion 11 preferably includes valve actuation means 16, such as, for example, a button or lever-actuated piston valve of the type that is well known in the art, operable for controlling airflow between the compressed air line attachment means 30 and the air injection port 14. An airflow conduit 31 (FIG. 3) provides fluid communication between the proximal end 15 of the tool 10 and the air injection port 14.

Figure 4:
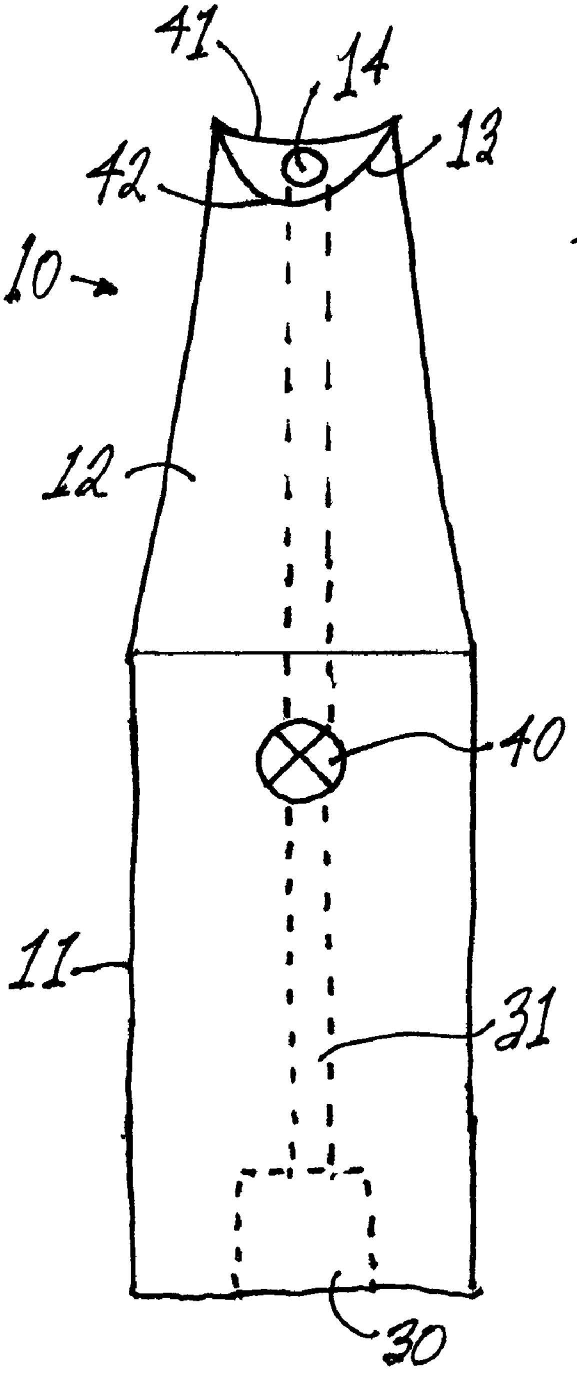
FIG. 4 is a longitudinal plan view of the first preferred embodiment of the pneumatic handgrip tool of FIGS. 1–3.
Figure 5:
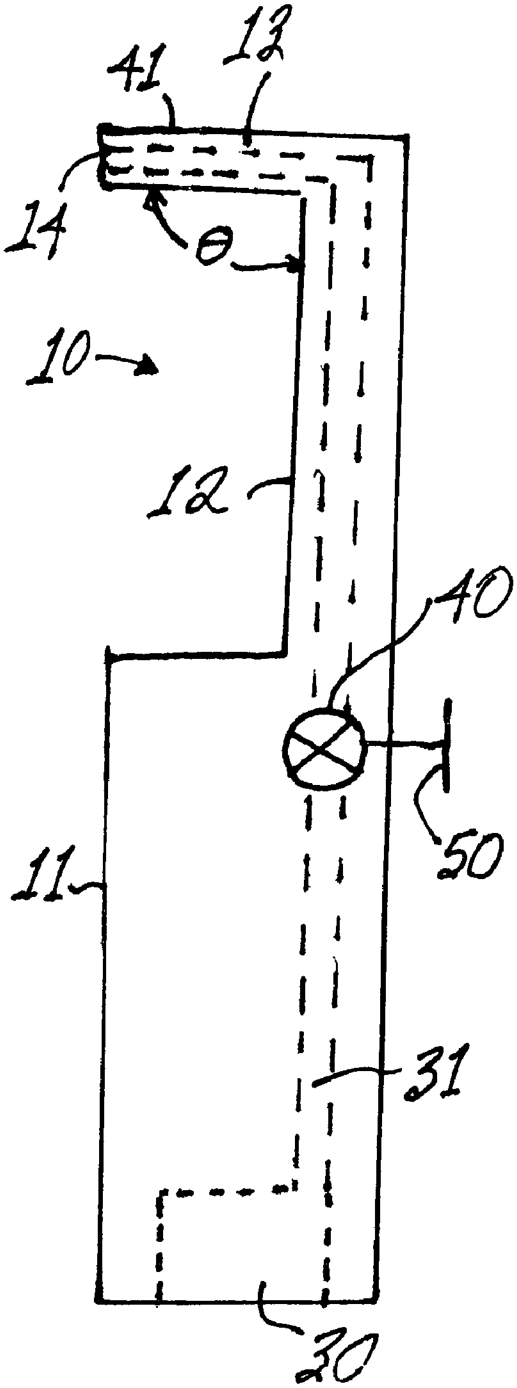
FIG. 5 is a longitudinal plan view of the tool of FIG. 4 rotated 90°.

With reference now to FIGS. 4 and 5, the extension portion 12 of the tool 10 extends distally from the handle portion and supports an insertion tip 13. The insertion tip is disposed at an angle θ, preferably about 90°, with respect to the direction of the conduit 31 disposed within, and coextensive with, the handle portion 11 and the extension portion 12 of the tool 10. The insertion tip 13 is preferably crescent-shaped in transverse end view, as shown in FIG. 4, having a generally cylindrically concave lower surface 41 with a curvature that substantially conforms to the curvature of the cylindrical outer surface of a tubular member 60 (FIG. 6) to which a prior art handgrip 61 is to be attached, and a generally cylindrically convex upper surface 42 that substantially conforms to the curvature of the inner surface of the cylindrical cavity within a handgrip. The air injection port 14 at the distal end of the insertion tip portion 13 is the distal terminus of the air-conducting conduit 31. A valve 40 controls the flow of air through the conduit 31 and is actuated by depressing a button 50 or a lever. The valve actuating means such as a depressable button or lever may be disposed either on the handle portion 11 or the extension portion 12 of the tool 10.

Figure 6:
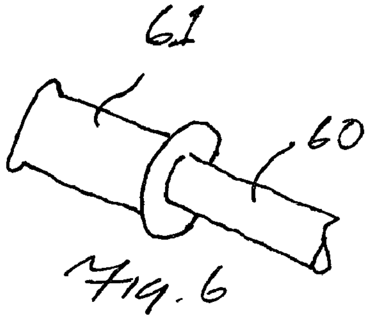
FIGS. 6–10 are a series of perspective views of the handgrip tool of FIGS. 1–5 being employed to install a handgrip on a motorcycle handlebar.
Figure 7:
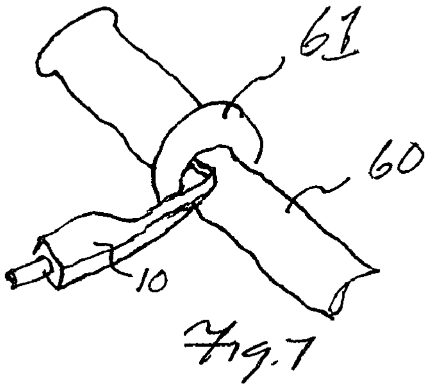
Figure 8:
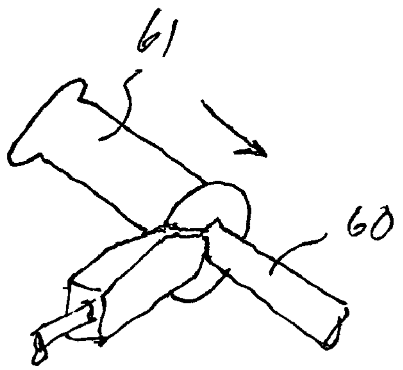
Figure 9:
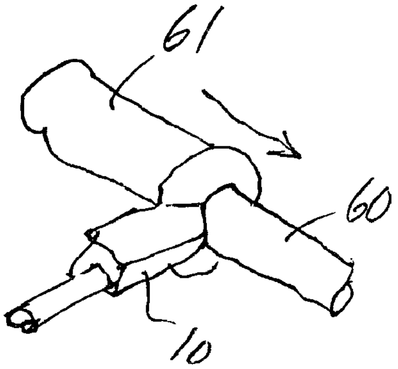
Figure 10:
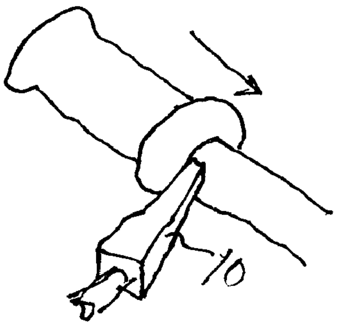

With reference now to FIGS. 6–10, the method for using the handgrip tool of the present invention to install a handgrip 61 on a tubular member 60 comprising a motorcycle handlebar is illustrated in perspective view. The open end of an elastically deformable handgrip 61 is inserted over an end of the tubular member 60 as shown in FIG. 6. The insertion tip 13 is inserted between the handgrip and the tubular member as shown in FIG. 7. This step can be facilitated by lifting the handstop on the handgrip to provide a space, usually crescent-shaped, in which to insert the insertion tip of the tool. The handgrip is then grasped by the installer's hand as shown in FIG. 8. The valve 40 is then actuated to force air between the handgrip and the tubular member and the handgrip is simultaneously advanced onto the tubular member, moving the insertion tip with the handgrip as it's advanced, as illustrated in FIG. 9. When the handgrip is fully advanced, as shown in FIG. 10, the insertion tip is removed from the interface between the handgrip and the tubular member and the airflow terminated. In the event that the tubular member is hollow, it may be desirable to plug the opposing end of the tubular member during installation to prevent leakage of compressed air from the interface between the inner surface of the handgrip and the cylindrical outer surface of the tubular member.

Figure 11:
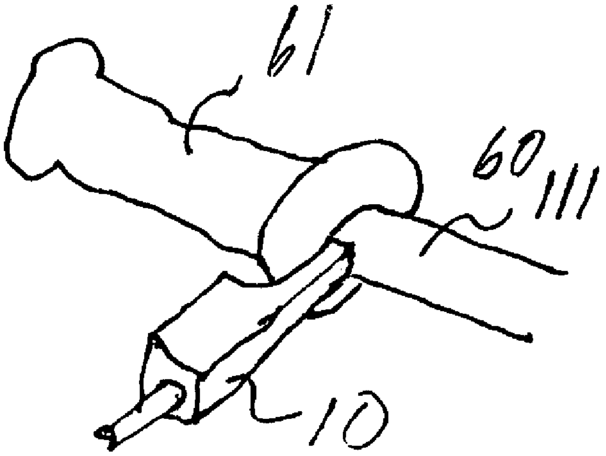
FIGS. 11–13 are a series of perspective views of the handgrip tool of FIGS. 1–5 illustrating steps wherein the handgrip tool is employed to remove a handgrip from a motorcycle handlebar.
Figure 12:
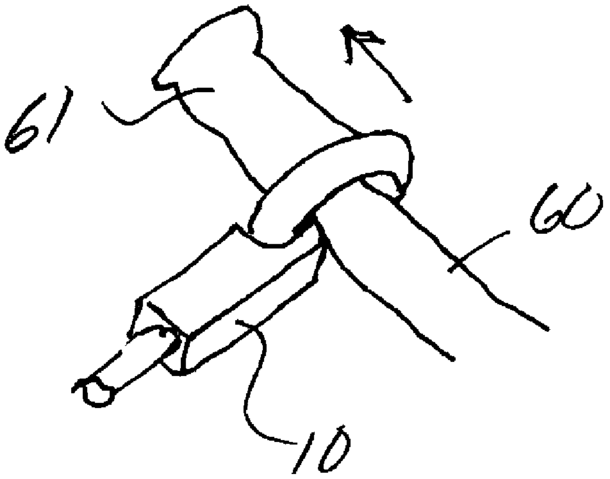
Figure 13:
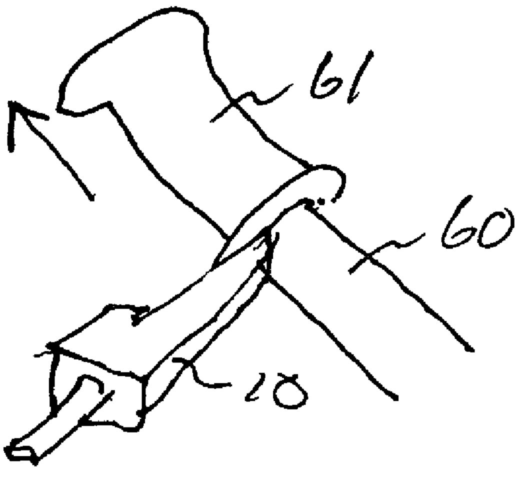

To remove a previously installed handgrip from a tubular member, the above steps are reversed as shown in FIGS. 11–13. First, the insertion tip is inserted between the handgrip and the tubular member as illustrated in FIG. 11. In practice, the handgrip is usually adjacent to a control mechanism 110 mounted on the handlebar 111. By making the insertion tip portion short, and disposing the insertion tip at a 90° angle with respect to the axis of the handle portion, it is possible to insert the insertion tip between the handgrip and control mechanism and advance the insertion tip into the interface between the handgrip and the handlebar. Once the insertion tip is positioned within the interface, the valve is actuated to inject compressed air into the interface between the inner surface of the handgrip and the outer surface of the tubular member while applying traction to the handgrip as shown in FIG. 12. The tool is moved along with the handgrip to keep the insertion tip within the interface as the handgrip is removed from the tubular member as shown in FIG. 13.

While particular embodiments of the present invention have been illustrated and described, it would be obvious to those skilled in the art that various other changes and modifications can be made without departing from the spirit and scope of the invention. For example, while the example presented herein shows the injection of compressed air into the interface between a handgrip and a tubular member to facilitate installation and removal of the handgrip, other fluidic mediums such as a liquid could also be used. In addition, the handle portion, extension portion and the insertion tip may be molded and have either unitary or integral construction. It is therefore intended to cover in the appended claims all such changes and modifications that are within the scope of this invention.

What I claimed is:

1. A device operable for injecting a fluid medium from a source of said fluid medium having a fluid output port into an interface between a handgrip and a tubular member, wherein the handgrip comprises an elongate, substantially cylindrical member comprised of an elastomeric material and having a cylindrical recess in an open end thereof, said cylindrical recess defining a cavity, said device comprising:

(a) a handle portion adapted to be grasped by a hand, said handle portion having a proximal end adapted to sealingly engage said fluid outlet port of said source of said fluid medium, a distal end and a first fluid-conducting conduit defining a first axis therebetween;

(b) an insertion tip having a proximal end affixed to and sealingly engaging said distal end of said handle portion, a distal end having an opening therein and a second fluid-conducting conduit in fluid communication with said first fluid-conducting conduit and said opening, said second fluid conducting conduit defining a second axis that is angled at about 90° with respect to to said first axis, and wherein said distal end of said insertion tip has a crescent-shaped transverse cross-section.

2. The device of claim 1 wherein said handle portion further comprises a valve operable for contolling fluid flow through said first fluid-conducting conduit.

* * * * *